United States Patent
Freimann et al.

(10) Patent No.: US 6,940,607 B2
(45) Date of Patent: Sep. 6, 2005

(54) METHOD FOR ABSOLUTE CALIBRATION OF AN INTERFEROMETER

(75) Inventors: Rolf Freimann, Aalen (DE);
Maximilian Mayer, Aalen-Dewangen (DE); Stephan Reichelt, Leinfelden-Echterdingen (DE)

(73) Assignee: Carl Zeiss SMT AG, Oberkochen (DE)

( * ) Notice: Subject to any disclaimer, the term of this patent is extended or adjusted under 35 U.S.C. 154(b) by 499 days.

(21) Appl. No.: 10/153,832

(22) Filed: May 21, 2002

(65) Prior Publication Data

US 2003/0025915 A1 Feb. 6, 2003

(30) Foreign Application Priority Data

May 26, 2001 (DE) .......................................... 101 25 785

(51) Int. Cl.⁷ ................................................. G01B 9/02
(52) U.S. Cl. ...................................... 356/521; 356/499
(58) Field of Search ................................ 356/488, 489, 356/490, 494, 495, 499, 512, 521, 496, 497, 498, 500, 513

(56) References Cited

U.S. PATENT DOCUMENTS

| | | | |
|---|---|---|---|
| 4,865,454 A | * | 9/1989 | Lazzarini et al. |
| 5,018,861 A | * | 5/1991 | Remo |
| 5,039,223 A | * | 8/1991 | Gemma et al. |
| 6,015,969 A | * | 1/2000 | Nathel et al. |
| 6,312,373 B1 | * | 11/2001 | Ichihara |
| 6,359,692 B1 | * | 3/2002 | Groot |
| 6,486,961 B1 | * | 11/2002 | Szfraniec et al. |
| 6,690,846 B2 | * | 2/2004 | Zhou et al. |
| 6,744,517 B1 | * | 6/2004 | Forno et al. |

FOREIGN PATENT DOCUMENTS

| | | |
|---|---|---|
| DE | 198 22 453 A | 12/1999 |
| JP | 0 831 298 A2 | 3/1998 |
| JP | 10 090113 | 4/1998 |

OTHER PUBLICATIONS

Schulz, G. et al. "Calibration of an Interferometer for Testing Cylindrical Surfaces", Jun. 15, 1995, pp. 512–520.
(Optics Communications, North–Holland Publishing Co., Amsterdam, NI, Bd. 117, Nr. 5).

* cited by examiner

Primary Examiner—Gregory J. Toatley, Jr.
Assistant Examiner—Patrick Connolly
(74) Attorney, Agent, or Firm—Wells St. John, P.S.

(57) ABSTRACT

In the case of a method for absolute calibration of an interferometer with the aid of a spherical output wave, comprising an optical element which retroflects the incident spherical wave itself or via a mirror, at least four measuring procedures are undertaken to determine a wave aberration W. The optical element is measured in the at least four measuring positions intrafocally and extrafocally in at least two different rotational angle positions. It is also possible, in addition, to undertake a measurement via a mirror in the cat's eye position (focus 3).

24 Claims, 2 Drawing Sheets

METHOD FOR ABSOLUTE CALIBRATION OF AN INTERFEROMETER

CROSS REFERENCE TO RELATED APPLICATION

This application relates to and claims priority to corresponding German Patent Application No. 101 25 785.6 filed on May 26, 2001.

BACKGROUND OF THE INVENTION

1. Field of the Invention

The invention relates to a method for absolute calibration of an interferometer with the aid of a spherical output wave.

The invention relates to a method for determining the measurement accuracy of a recording device for a diffractive optical element.

2. Description of the Related Art

Two methods are used in practice for the absolute determination of the measurement error of interferometers for the purpose of checking the fit of spherical surfaces, specifically the classic three-position test and the rotating-disc method. The main disadvantage of the known methods resides in the low number of absolute calibration methods for interferometers with a spherical output wave. Each method is subject to errors, and in order to determine these more closely it would be very advantageous to have additional absolute calibration methods for comparison.

SUMMARY OF THE INVENTION

It is the object of the present invention to create a novel absolute calibration method for interferometers with a spherical output wave, which can be used to measure at least as accurately as can be done with the aid of the previously known methods, a further possibility thereby being provided of assessing more effectively the accuracy of the absolute calibration.

This object is achieved according to the invention by a method for absolute calibration of an interferometer with the aid of a spherical output wave, comprising an optical element which retroflects an incident spherical wave itself or via a mirror, at least four measuring procedures being undertaken to determine a wave aberration W, the optical element being measured in the at least four measuring positions intrafocally and extrafocally in at least two different rotational angle positions.

An essential feature of the invention is formed in this case by the optical element which retroflects the incident spherical wave itself or via a mirror. In an advantageous refinement, use is made for this purpose of a rotationally symmetrical diffractive optical element in reflection or in transmission with the aid of a mirror. In this case, the optical element or the diffractive optical element is to be configured such that in case of two positions, the initially convergent spherical output wave of the interferometer is retroflected into itself in the cast or a reflection-diffractive optical element, termed DOE for short below, or is in combination with a mirror arranged downstream thereof as transmission DOE. This must be rotated in the individual rotational positions exactly like the DOE.

In the latter variant, the DOE can also be designed as an off-axis DOE with a linear carrier (spatially constant carrier frequency). The mirror must be tilted appropriately because of the linear carrier. The sign of the angle of tilt changes between intrafocal and extrafocal positions, while its absolute value remains the same. This possibility expands the spectrum of DOEs which can be measured in absolute terms according to the invention.

The inventor proceeded in this case from the finding that the DOE operates in the +1th or, in entirely general terms, a +mth order of diffraction in one position, and in the −1th or, more generally, in a −mth order of diffraction in the other position. In this way, the sign of the DOE aberrations reverses, while the signs of all other system errors remain the same.

In an advantageous embodiment of the invention, a measurement is also undertaken in addition in the cat's eye position (focal position). It is not necessary to use the DOE for this purpose, but it is also possible here to make use of the simple way of a mirror, in general a plane mirror. The cat's eye position can also be dispensed with if a highly flat DOE substrate is used and its fitting errors are determined separately in an interferometric or tactile fashion. It is possible in this case when plotting the DOE to select a path which ensures that the DOE substrate does not change fitting errors.

The measuring method according to the invention yields interferometer errors in absolute terms and fitting errors of the DOE and DOE aberrations in absolute terms.

The basic idea of the present invention can also be used to determine the measurement accuracy of a recording device for a diffractive optical element (DOE). The quality of a recording device can be determined in absolute terms in this case. The wave aberration of the DOE is determined in absolute terms from the wave aberration in the intrafocal position minus the wave aberration in the extrafocal position, the DOE error being obtained in absolute terms.

Advantageous refinements and developments emerge from the remaining subclaims and from the following exemplary embodiment described in principle with the aid of the drawing, in which:

DETAILED DESCRIPTION

Figure 1:
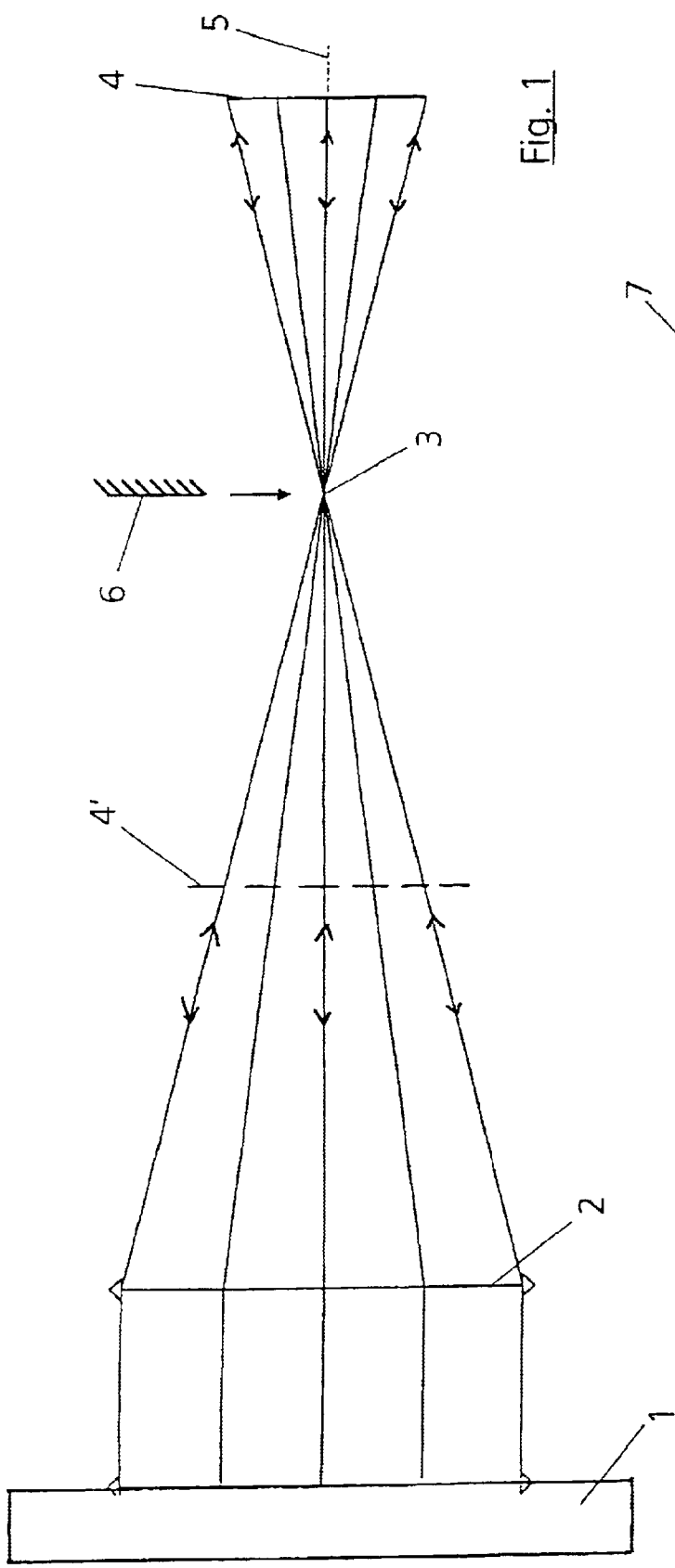
FIG. 1 shows an illustration of the principle of the method according to the invention with a DOE in reflection.

According to the exemplary embodiment in accordance with FIG. 1, five measurements are provided for absolute calibration of an interferometer 1 with a reference surface. For this purpose, a spherical output wave of the interferometer traverses a lens 2 downstream of which the wave converges. Arranged in the direction in which the beam runs downstream of a focus 3 after which the wave diverges again is a DOE 4 which serves as an optical element in reflection and retroflects the incoming spherical wave into itself. A first measurement is performed in this position. In a second measurement, the DOE 4 is rotated by 180° about the optical axis 5.

The DOE 4 is subsequently brought from the above-named extrafocal position into an intrafocal position which is illustrated by dashes in FIG. 1 and the DOE is denoted by 4'. In this position, a third measurement is carried out in the 0° position, after which the DOE 4' is rotated by 180° about the optical axis 5 and a fourth measurement is carried out. After removal of the DOE 4', a plane mirror 6 is inserted in the direction of the arrow in a cat's eye position or in the focal position, that is to say at the focus 3, and a fifth measurement is carried out.

In the intrafocal position, the DOE 4' works in the +1st order of diffraction, while in the extrafocal position the DOE 4 operates in the −1st order of diffraction. In each case, however, all the incident beams are retroflected into themselves. In this case, the beams need not be perpendicular to the DOE in order to run back into themselves.

Figure 2:
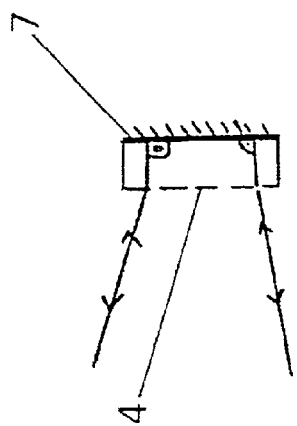
FIG. 2 shows a detail of the illustration of the principle according to FIG. 1, with a DOE in transmission and with a plane mirror.

If a DOE 4 in transmission is selected, a plane mirror 7 which reflects the perpendicularly impinging beams is arranged downstream of the DOE 4. This configuration is indicated in a detail in FIG. 2. Here, as well, two times two measurements are respectively performed with the aid of the DOE in the intrafocal position and in the extrafocal position in two rotation angle positions with a plane mirror 7 arranged therebehind in each case. The measurement in the cat's eye position with the aid of the plane mirror 6 is also performed in the same way.

It is advantageous to select the rear side of the substrate for this purpose. However, it is possible to arrange a plane mirror 7 further away. This is necessary, in particular, if the DOE is designed as an off-axis DOE with a linear carrier, in order to be able to tilt the plane mirror 7.

The total of five measurements can be used to measure separately and in absolute terms the DOE aberrations $W_{DOE}$ caused by recording errors, the substrate fitting errors $W_{Passe}$ and the interferometer errors $W_{int}$. In the case of a DOE in transmission, the inhomogeneities of the substrate and the fitting errors of the plane mirror also feature in the substrate fitting errors $W_{passe}$, and cannot be determined separately. There is a need with five measurements for two more than in the case of the classic three-position test for spherical test samples, because here there is a need to determine not only test sample fitting errors, but also the DOE aberrations.

For the measuring procedure itself:

Measurement 1: DOE intrafocal, rotational angle 0° relative to a reference point in space, measured variable $W_{I0}$
Measurement 2: DOE intrafocal, rotational angle 180° relative to the selected reference point, measured variable $W_{rI80}$
Measurement 3: Cat's eye position, measured variable $W_{CAT}$
Measurement 4: DOE extrafocal, rotational angle 0° relative to the reference point, measured variable $W_{E0}$
Measurement 5: DOE extrafocal, rotational angle 180° relative to the reference point, measured variable $W_{E180}$ In this case, W respectively denotes the wave aberration W measured with the aid of the interferometer 1 in the double passage, and is counted positively when the wave front leads a reference wave front when seen in the beam direction.

Strictly speaking, fitting errors of the DOE substrate feature slightly differently in the intrafocal and extrafocal positions, since the incident beams impinge from different directions. In a numerical simulation with the aid of an optical computer program, it was ascertained, however, that this difference remains smaller than 1 per thousand in the case of the usual, long wave fitting errors such as defocusing, spherical aberration or similar Zernike errors up to a size of a wavelength p−v. In practice, the fitting errors are smaller by far, such that the measurement errors owing to this directivity remain negligibly small.

The sign of the DOE aberration rotates in the extrafocal position by comparison with the intrafocal position.

The following evaluation formulae are required for evaluation:

$$W_{I0} = W_R + W_{APL} + W_{DOE} + W_{PASSE} \quad (1a \ldots 1e)$$
$$W_{I180} = W_R + W_{APL} + \overline{W}_{DOE} + \overline{W}_{PASSE}$$
$$W_{CAT} = W_R + \frac{W_{APL} + \overline{W}_{APL}}{2}$$
$$W_{E0} = W_R + W_{APL} - W_{DOE} + \overline{W}_{PASSE}$$
$$W_{E180} = W_R + W_{APL} - W_{DOE} + W_{PASSE}$$

Here:

$W_R$: is the measured wave aberration owing to reference surface errors.
$W_{APL}$: is the measured wave aberration owing to errors in the interferometer optical system, for example in the aplanatic interferometer lens, or on the basis of reference surface errors which are also active during passage in the case of the special reference surface arrangement.
$W_{DOE}$: is the measured wave aberration caused by DOE recording errors.
$W_{PASSE}$: is the measured wave aberration caused by fitting errors of the DOE substrate, if appropriate including the plane mirror fitting errors in the case of a DOE in transmission.
$W_{INT}$: is the interferometer error which is the sum of $W_R$ and $W_{APL}$:

$$W_{INT} = W_R + W_{APL} \quad (2)$$

In accordance with the above-named evaluation formulae, the following two intermediate variables are formed from (1a . . . 1e), the two intrafocal or the extrafocal positions being brought in respectively in combination with the cat's eye position:

$$W_I = \frac{W_{I0} + \overline{W}_{I180}}{2} - \frac{W_{CAT} + \overline{W}_{CAT}}{2} = W_{DOE} + W_{PASSE} \quad (3)$$

$$W_E = \frac{W_{E0} + \overline{W}_{I180}}{2} - \frac{W_{CAT} + \overline{W}_{CAT}}{2} = -\overline{W}_{DOE} + W_{PASSE} \quad (4)$$

All three variables being sought can now be immediately specified in absolute terms:

$$W_{DOE} = \frac{W_I - \overline{W}_E}{2} \quad (5)$$

$$W_{PASSE} = \frac{W_I + \overline{W}_E}{2} \quad (6)$$

$$W_{INT} = W_{I0} - W_I = W_{E0} - W_E \quad (7)$$

Since the interferometer errors can be determined in two ways in accordance with (7) it is advantageous with regard to an improved measurement accuracy to use the arithmetic mean of the two results.

If interest now centres only on the DOE aberrations, it is also possible to dispense with the cat's eye position and calculate $W_{DOE}$ purely from (1a, 1b, 1d, 1e):

$$W_{DOE} = \frac{W_{I0} - W_{E180}}{2} = \frac{W_{I180} - \overline{W}_{E0}}{2} \tag{8}$$

As may be seen, at least two measurements suffice for this purpose.

With regard to a high measurement accuracy, however, it is also sensible here once again to take the mean of the two results, that is to say to wait for four measurements.

This simplified evaluation is suitable, for example, for the purpose of determining the measurement accuracy of a DOE recording device.

It is also possible, if appropriate, to dispense with the cat's eye position, which can sometimes exhibit inaccuracies in practice, when a highly planar DOE substrate is fabricated and the fitting errors thereof are determined separately interferometrically or in a tactile fashion. In this case, it is possible when plotting the DOE to select a path for which it is ensured that the DOE does not change the substrate fitting errors. This is the case, for example, with a thick substrate and a DOE material which exerts few stresses, for example photoresist. If the DOE aberrations are determined in this way in absolute terms without the cat's eye position using equation (8), all aberrations of the DOE are thereby known accurately in turn, and the cat's eye position has been bypassed.

Equation (8) therefore shows that the cat's eye position is necessary only in order to separate fitting errors from interferometer errors. If the fitting errors are determined separately, there is no need for the cat's eye position.

The above-named measurement yields an improved estimate of accuracy for absolute calibration. The reason for this, inter alia, is that not only—as in the prior art—are three measurements used, but five measurements, produced in a different way, it thereby being possible to average out errors more effectively.

The aberrations of the DOE and the substrate fitting errors are therefore measured in absolute terms. For this purpose, the method is an absolute calibration method for DOEs which are designed in the way described. It is thereby possible to assess the recording accuracy of the DOE. This is important for characterizing the recording process. In particular, in order to compare different DOE recorders it is possible to use a DOE suitable for the above-described measuring method to record on all recorders which measure DOEs in absolute terms, and thereby to assess the quality of the recorders.

After the absolute measurement of the DOE, the DOE now known accurately in terms of its beam deflecting properties can be used as a standard element in other optical devices, for example in other interferometers, than those used for measurement, and thereby to calibrate these.

It is also possible to measure the DOE once in a very accurate fashion and to use it later to recalibrate the interferometer used for measurement.

Starting from the cat's eye position, it is possible to approach the two other positions with high accuracy, thus improving the measurement accuracy, in particular as regards the rotationally symmetrical contributions to the aberrations. In particular, it is also rendered possible to measure the defocus in absolute terms as a DOE aberration. A suitably high displacement accuracy would, for example, be rendered possible by the use of a laser path length measuring system; other path measuring devices are also conceivable. If such a precise displacement is not possible, the DOE will be adjusted manually intrafocally and extrafocally into straight strips (defocus zero) and as few aberrations as possible in the interferogram.

If operations are being conducted not in the ±1st, but in higher, ±mth orders of diffraction, the observed DOE aberrations multiply by the factor m given the same DOE recording errors. In other words, the measuring sensitivity for DOE recording errors rises by just this factor. Such a relatively high order of diffraction would mean that the interferometer lens is very strongly opened, but aperture numbers of down to F/0.5 are feasible and present no particular problem. Such arrangements yield the possibility of measuring DOE recording errors with high sensitivity.

In a further refinement, more than two rotational positions could be introduced. In the case of the example of twelve rotational positions, two opposite ones will be evaluated in each case using the above equations, and the measurement results will be turned back appropriately. More individual measurements are then obtained, and this leads to a more accurate measurement.

Since the DOE is situated on a flat surface, the diffraction is not aplanatic. It may be necessary to reckon with a maladjustment coma. It is therefore advantageous to design the DOE holder such that it can be precisely adjusted mechanically. In particular, the mechanical axis of rotation should coincide as accurately as possible with the DOE centre.

It has proved that for the purpose of a high level of stability for the DOE it can be sensible when the latter is designed as a reflection DOE to record it on Zerodur or a similar substrate material with a vanishingly small coefficient of thermal expansion. In the case of the design as a transmission DOE, quartz glass would be advantageous, because it has a low coefficient of thermal expansion and is highly transparent. The simplest way to provide the plane mirror on the rear side is an aluminized rear side.

The use of a frequency-stabilized laser can increase the measurement accuracy, in particular when air pressure, humidity and temperature are simultaneously recorded. The laser wavelength in air is then known very accurately. If the said wavelength deviates from that used in the optical calculation, a mathematical correction can be carried out subsequently. This can be advantageous particularly in the case of the rotationally symmetrical contributions to the aberrations.

A chromium mask can be used as reflection DOE.

It is also possible to use the above measuring method for an absolute measurement of aberrations of those DOEs which convert the incident spherical wave into an aspherical wave by reflection and diffraction, or by diffraction in transmission with a plane mirror downstream thereof. Four measurements, specifically intrafocally and extrafocally respectively in the two different rotational positions are carried out in the same way in this case, with the measurement results $W_{I0}$, $W_{I180}$, $W_{E0}$ and $W_{E180}$.

The aspherical wave fronts occurring in intrafocal and extrafocal positions for nondefective DOEs can be determined by an optical calculation. In this case, the wave fronts are rotationally symmetrical and it holds in general that $W_{I\_asph} \neq W_{E\_asph}$.

These asphericities are derived in the following way from the four measurement results:

$$W'_{I0} = W_{I0} - W_{I\_asph} \qquad W'_{E0} = W_{E0} - W_{E\_asph}$$

$$W'_{I180} = W_{I180} - W_{I\_asph} \quad W'_{E180} = W_{E180} - W_{E\_asph}$$

The DOE aberrations can be calculated by analogy with equations (5) or (8) by using the primed variables.

The method according to the invention can also be used to achieve a recording process calibration of DOE recorders. The aim in this case is to determine the current recording process errors in order to be able to eliminate these from the measurement results, since every DOE recorder has residual errors.

Figure 3:
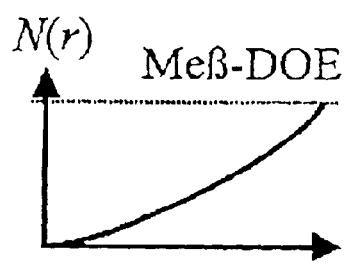
FIG. 3 shows a graph for the variation in curve density in the case of a measuring DOE.
Figure 5:
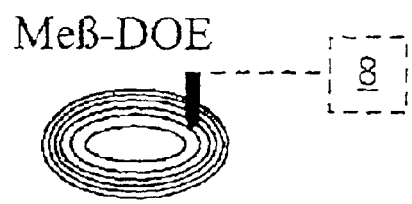
FIG. 5 shows a view of a measuring DOE in an illustration of the principle.

For this purpose, a recorder plots a measurement DOE which is to be used later to measure a test sample. For this purpose, FIG. 3 shows in accordance with the optical design the variations in the groove density N against the radius r of the DOE. FIG. 5 shows in this regard an illustration of the principle of the rings of the measuring DOE.

Figure 4:
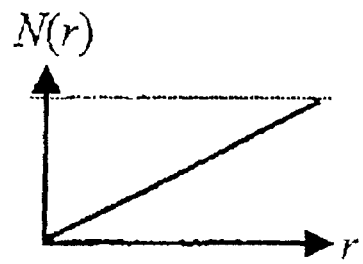
FIG. 4 shows a graph for the variation in curve density in the case of a calibrating DOE.
Figure 6:
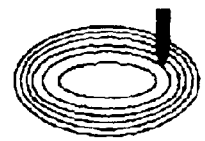
FIG. 6 shows a view of a calibrating DOE in an illustration of the principle.

The measuring DOE is necessarily subject to residual errors. These systematic recording errors are now to be determined by calibration. Plotted for this purpose is a second DOE, whose groove density profile at the edge is intended to correspond to that of the measuring DOE, in order to obtain largely identical conditions. However, in this case the groove density profile is to be selected such that a spherical wave is again retroflected exactly into itself. The groove density profile N of the calibrating DOE is illustrated in FIG. 4. An illustration of the principle of the calibrating DOE with the rings is shown in FIG. 6.

Figure 7:
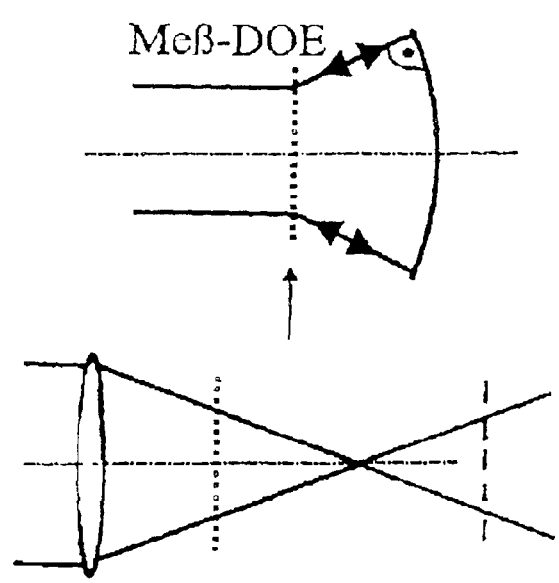
FIG. 7 shows an illustration of the principle relating to the elimination or a writing process error by means of absolute measurement of a calibrating DOE in the case of a measuring DOE with a test sample.

Following directly upon the plotting of the measuring DOE, the calibrating DOE is plotted in accordance with FIG. 4 on the same recorder or a recording device 8. It is assumed in this case that the plotting process has not changed. Subsequently, the calibrating DOE is measured in absolute terms using the above described method, the DOE error then being obtained in absolute terms. Since the previously described measuring DOE has a similar design, it will therefore inherently have the same error. This means that this error can subsequently be subtracted, thus calibrating the recording process. It is clear from FIG. 7, the arrow in the direction of the measuring DOE with the test sample indicating that recording process errors are thereby eliminated.

Determining the quality of DOE recorders 8 requires only at least two measuring positions with the intrafocal and the extrafocal measurement. There is no need to measure the cat's eye position.

What is claimed is:

1. Method for absolute calibration of an interferometer with the aid of a spherical output wave, comprising a diffractive optical element which is used in reflection such that it retroflects an incident spherical wave, at least four measuring procedures being carried out to determine a wave aberration W, a first and a second measuring procedure being carried out in an extrafocal position at two different rotational angle positions of the diffractive optical element and a third and a fourth measuring procedure being carried out in an intrafocal position at two different rotational angle positions of the diffractive optical element.

2. Method according to claim 1, characterized in that in addition at least one fifth measuring procedure is carried out via a mirror in the cat's eye position.

3. Method according to claim 2, characterized in that the at least one fifth measuring procedure is carried out in the cat's eye position with the aid of a plane mirror.

4. Method according to claim 1, characterized in that the at least two different rotational angle positions are produced by a 0° position of the diffractive optical element and a position rotated by 180° thereto.

5. Method according to claim 1, characterized in that more than two rotational angle positions are used for carrying out the measuring procedures.

6. Method according to claim 1, characterized in that averaging is carried out between the measuring procedures in the intrafocal position and in the extrafocal position in order to increase the measurement accuracy.

7. Method according to claim 1, characterized in that the measuring procedures are carried out at one of a first order of diffraction and a higher order of diffraction.

8. Method according to claim 1, characterized in that a mechanical axis of rotation of the diffractive optical element coincides at least approximately with a center of the diffractive optical element.

9. Method according to claim 1, characterized in that use is made of a diffractive optical element with a very low coefficient of expansion.

10. Method according to claim 9, characterized in that Zerodur is used as diffractive optical element.

11. Method according to claim 1, characterized in that a frequency-stabilized laser is used as radiation source.

12. Method for absolute calibration of an interferometer with the aid of a spherical output wave, comprising an arrangement of a diffractive optical element which is used in transmission and a mirror, the arrangement of the diffractive optical element and the mirror retroflecting an incident spherical wave, at least four measuring procedures being carried out to determine a wave aberration W, a first and a second measuring procedure being carried out in an extrafocal position at two different rotational angle positions of the arrangement of the diffractive optical element and the mirror and a third and a fourth measuring procedure being carried out in an intrafocal position at two different rotational angle positions of the arrangement of the diffractive optical element and the mirror.

13. Method according to claim 12, characterized in that in addition at least one fifth measuring procedure is carried out via a mirror in the cat's eye position.

14. Method according to claim 13, characterized in that the at least one fifth measuring procedure is carried out in the cat's eye position with the aid of a plane mirror.

15. Method according to claim 12, characterized in that the at least two different rotational angle positions are produced by a 0° position of the arrangement of the diffractive optical element and the mirror and a position rotated by 180° thereto.

16. Method according to claim 12, characterized in that more than two rotational angle positions are used for carrying out the measuring procedures.

17. Method according to claim 12, characterized in that averaging is carried out between the measuring procedures in the intrafocal position and in the extrafocal position in order to increase the measurement accuracy.

18. Method according to claim 12, characterized in that the measuring procedures are carried out at one of a first order of diffraction and a higher order of diffraction.

19. Method according to claim 12, characterized in that a mechanical axis of rotation of the arrangement of the diffractive optical element and the mirror coincides at least approximately with a center of the arrangement of the diffractive optical element and the mirror.

20. Method according to claim 12, characterized in that use is made of a diffractive optical element with a very low coefficient of expansion.

21. Method according to claim 20, characterized in that quartz glass is used as diffractive optical element.

22. Method according to claim 12, characterized in that a frequency-stabilized laser is used as radiation source.

23. Method for determining the measurement accuracy of a recording device for a diffractive optical element with the aid of an interferometer which generates a spherical output wave, comprising a diffractive optical element which is used in reflection such that it retroflects an incident spherical wave, at least two measuring procedures being carried out with the aid of the diffractive optical element, at least in each case one in an intrafocal and one in an extrafocal position of the diffractive optical element with rotational angle positions differing by 180°.

24. Method for determining the measurement accuracy of a recording device for a diffractive optical element with the aid of an interferometer which generates a spherical output wave, comprising an arrangement of a diffractive optical element which is used in transmission and a mirror, the arrangement of the diffractive optical element and the mirror retroflecting an incident spherical wave, at least two measuring procedures being carried out with the aid of the arrangement of the diffractive optical element and the mirror, at least in each case one in an intrafocal and one in an extrafocal position of the arrangement of the diffractive optical element and the mirror with rotational angle positions differing by 180°.

* * * * *

UNITED STATES PATENT AND TRADEMARK OFFICE
CERTIFICATE OF CORRECTION

PATENT NO. : 6,940,607 B2
APPLICATION NO. : 10/153832
DATED : September 6, 2005
INVENTOR(S) : Rolf Freimann et al.

It is certified that error appears in the above-identified patent and that said Letters Patent is hereby corrected as shown below:

Col. 1, line 59 –
Replace "into itself in the cast or a reflection-diffractive optical"
With --into itself in the case of a reflection-diffractive optical--

Col. 2, line 6 –
Replace "the DOE operates in the +1th or, in entirely general terms,"
With --the DOE operates in the +1st or, in entirely general terms,--

Col. 2, line 7 –
Replace "a +mth order of diffraction in one position, and in the -1th"
With --a +mth order of diffraction in one position, and in the -1st--

Col. 2, line 57 –
Replace "elimination or a writing process error by means of absolute"
With --elimination of a writing process error by means of absolute--

Col. 3, line 56 –
Replace "variable $W_{r180}$"
With --variable $W_{I180}$--

Col. 3, line 61 –
Replace "relative to the reference point, measured variable $W_{E160}$"
With --relative to the reference point, measured variable $W_{E180}$--

UNITED STATES PATENT AND TRADEMARK OFFICE
CERTIFICATE OF CORRECTION

PATENT NO. : 6,940,607 B2
APPLICATION NO. : 10/153832
DATED : September 6, 2005
INVENTOR(S) : Rolf Freimann et al.

It is certified that error appears in the above-identified patent and that said Letters Patent is hereby corrected as shown below:

Col. 4, line 21 –

Replace " $W_{E0} = W_R + W_{APL} - W_{DOE} + \overline{W}_{PASSE}$ "

With -- $W_{E0} = W_R + W_{APL} - \overline{W}_{DOE} + \overline{W}_{PASSE}$ --

Col. 5, line 7 –

Replace " $W_{DOE} = \dfrac{W_{I0} - W_{E180}}{2} = \dfrac{W_{I180} - \overline{W}_{E0}}{2}$ (8) "

With -- $W_{DOE} = \dfrac{W_{I0} - W_{E180}}{2} = \dfrac{\overline{W}_{I180} - \overline{W}_{E0}}{2}$ (8) --

Signed and Sealed this

Fourteenth Day of November, 2006

JON W. DUDAS
*Director of the United States Patent and Trademark Office*